United States Patent [19]

Jacobson et al.

[11] 3,957,167

[45] May 18, 1976

[54] TRANSPORTING DEVICE

[75] Inventors: Calvin L. Jacobson; William H. Ahlers, Jr., both of Harlan, Iowa

[73] Assignee: Harlan Mfg. Co., Inc., Harlan, Iowa

[22] Filed: Aug. 16, 1974

[21] Appl. No.: 498,184

[52] U.S. Cl. .......................... 214/766; 214/145 R; 280/415 A
[51] Int. Cl.² .......................................... B66F 9/00
[58] Field of Search .......... 214/145, 766, 620, 750, 214/140, 700, 701 R, 701 P; 280/415 A; 172/439

[56] References Cited
UNITED STATES PATENTS

| | | | |
|---|---|---|---|
| 3,198,357 | 8/1965 | Shelby | 214/766 |
| 3,266,599 | 8/1966 | Dearden | 214/700 |

FOREIGN PATENTS OR APPLICATIONS

| | | | |
|---|---|---|---|
| 784,162 | 10/1957 | United Kingdom | 214/766 |
| 156,967 | 9/1953 | Australia | 214/766 |
| 994,974 | 11/1951 | France | 214/620 |

Primary Examiner—Robert J. Spar
Assistant Examiner—Ross Weaver
Attorney, Agent, or Firm—Henderson, Strom & Sturm

[57] ABSTRACT

A fork lift type device for attachment to a three point hitch of a tractor and having a hydraulic cylinder connected to the upper point of the hitch for controlling the tilt of the fork lift. A vertical frame forms a base for supporting horizontally extending fork members. A vertically disposed square sleeve is rigidly affixed to the frame and a post member is received in one end of the sleeve. A pin selectively affixes the sleeve and post members together. The top of the post member has an apertured plate extending in one direction, for connection to the hydraulic cylinder, and a clevis structure extends in an opposite direction for allowing connection to a conventional three point hitch upper rod when the post member is turned 180 degrees. The sleeve member is open at each end so as to receive the post member in either end to thereby facilitate the turning of the fork lift structure over and thereby allowing a higher lifting capability to the fork lift.

5 Claims, 9 Drawing Figures

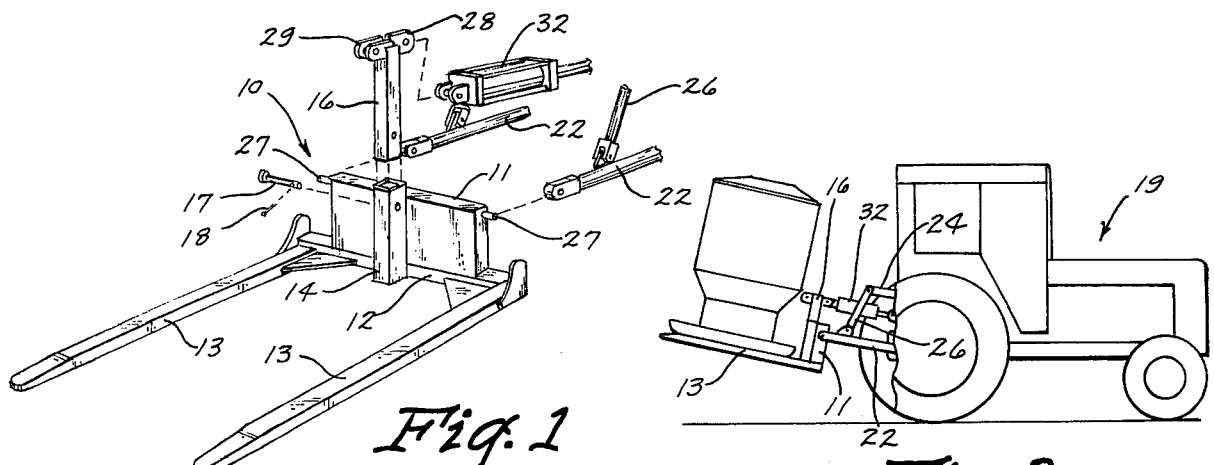

TRANSPORTING DEVICE

BACKGROUND OF THE INVENTION

The present invention relates generally to transporting devices and more particularly to a fork lift type of transporting device and a control therefor for attachment to a three point hitch of a tractor.

On the farm there are numerous bulky items such as large hay bales, feed bunks, fencing materials, hog feeders, pallets, etc., which need to be moved from place to place and which could probably be moved by fork lift trucks of the type normally used in warehouses. Since these fork lift trucks are very specialized pieces of equipment, the expense of obtaining and owning such equipment usually cannot be justified on an average farm. Since nearly every farming operation has at least one tractor, it has been found that fork lift type devices can be mounted on the three point hitch of such an agricultural tractor to thereby have a lifting and transporting capability without such a high additional expense. One problem, however, with placing a fork lift device on a tractor three point hitch is that the fork automatically tilts going up and down and there is no tilt control. Such a tilt control is needed to insure that the load will stay on the fork lift during transportation and yet be able to tilt for specilized loading and unloading situations.

Also, fork lift devices for use on a tractor three point hitch normally have a limited lifing height, limited by the height that the three point hitch will move upwardly. In some applications, however, there is a need for a slightly higher lifting capability.

SUMMARY OF THE INVENTION

The present invention relates to a fork lift apparatus to be used in conjunction with a three point hitch of a tractor. A mechanism is provided for allowing the connection of a hydraulic cylinder to the upper point of a three point hitch to facilitate controlling of the tilt angle of the fork lift apparatus, or for allowing connection of the fork lift apparatus to a normal three point connection without the hydraulic cylinder tilt control. The fork lift apparatus is also constructed such that it may be turned over and connected to a three point hitch so as to permit the forks of the lift to go higher than normal.

An object of the present invention is to provide a tilt control for a fork lift on a tractor's three point hitch.

Another object of the invention is to provide a fork lift which is adaptable to lift higher than conventional three point hitch fork type lifts.

A further object of the invention is to provide a fork lift which is versatile enough to work on a normal three point hitch, but which is also adaptable for use with the hydraulic tilt control of the present invention.

Still another object of the present invention is to provide a fork lift for an agricultural tractor which is reliable, but yet economical to manufacture.

Other objects, advantages, novel features of the present invention will become apparent from the following detailed description of the invention when considered in conjunction with the accompanying drawings.

BRIEF DESCRIPTION OF THE DRAWINGS

FIG. 1 is a perspective, slightly exploded, view of a fork lift according to the present invention;

FIG. 2 is a side elevational view of the present invention;

FIG. 3 is a side elevational view of the present invention connected to an agricultural tractor with the fork lift device in a transporting position;

FIG. 4 is a side elevational view of the present invention, but not using a tilt control;

FIG. 5 is a side elevational view of the present invention shown on an agricultural tractor in the process of lifting a feed bunk;

FIG. 6 shows the fork lift apparatus connected to a tractor three point hitch to obtain a maximum lifting capability;

FIG. 7 is a side elevational view of the present invention arranged as shown in FIG. 6, but shown connected an agricultural tractor and lifting a feed bunk;

FIG. 8 shows a modified perspective view of the present invention with additional forks for lifting stacks of hay and the like; and FIG. 9 shows the fork lift device of the present invention with the tilt control tilting the fork downwardly to facilitate loading and unloading.

DESCRIPTION OF THE PREFERRED EMBODIMENT

Referring now to the drawings wherein like reference numerals designate identical or corresponding parts throughout the several views, FIG. 1 shows a transporting device 10 in accordance with the present invention.

A laterally extending frame 11 serves as a base for the transporting device 10 and has a lower extending member 12 thereon. Longitudinally extending forks 13 project from each end of the laterally extending frame 11.

A sleeve 14 is attached to the laterally extending frame 11, such as by welding, and is of a square configuration in crosssection. The sleeve 14 is open at each end and is adapted to selectively receive a post member 16 in one end or the other. Normally the post member 16 is received into the top of the sleeve 14 and a pin 17 is disposed through each of the sleeves 14 and the post member 16 so as to selectively prevent movement of these two members with respect to each other when the pin is so disposed. A cotter key 18 insures that the pin 17 does not vibrate from its holding position.

FIG. 5 shows a tractor 19 having a conventional three point hitch mechanism 21 which consists basically of two parallel draft arms 22 and an upper bar 23. Also associated with the three point hitch mechanism are control arms 24 which are attached to each of the draft arms 22 by a links 26. The control arms 24 control the raising and lowering of the draft arms 22 by use of a control lever (not shown) conventionally located within reach of the tractor operator. Pins 27 on each end of the laterally extending frame 11 (FIG. 1) serve to pivotally attach the transporting device 10 to the draft arms 22.

The post member 16, though adjustable vertically, has four basic positions. In FIGS. 1–3 the post member 16 is so disposed in the sleeve 14 such that the single plate 28 extends forwardly in the direction of the tractor. The plate 28 has a central aperture therein which is adapted to mate with a clevis-like structure, such as that of a hydraulic cylinder. When the post member 16 is turned 180°, a clevis-like structure 29 extends forwardly towards the tractor and is ideally suited to connect with a conventional bar such as bar 23 of the three point hitch 21 (FIGS. 4 and 5). A pin 31 forms a pivotal connection between the clevis-like structure 29 and the bar 23.

It will be understood by persons skilled in the art that when the fork lift transporting device 10 is moved from a lower position to an upper position that it will automatically change its tilting angle. While this change of tilting angle may be desirable in certain instances, it is quite often desirable to be able to change the angle of tilt independently of the height that the device 10 has been lifted. In order to provide such a tilt control, a hydraulic cylinder 32 is used to replace the conventional bar 23 (FIG. 4). The hydraulic cylinder 32 (FIG. 2), is pivotally attached to the upper point 33 of the tractor three point hitch 21 by a pin 34 (FIG. 2). The other end of the hydraulic cylinder 32 has a clevis 35 thereon which forms a pivotal connection with plate 28 and the pin 36.

In the arrangement shown in FIGS. 4 and 5 which has only the conventional bar 23 in the connection to the three point hitch of tractor 19, it can be seen in FIG. 5 how an object such as a feed bunk 37 can be lifted and thereby transported from place to place.

FIGS. 1–3 and 9 show the transporting device 10 having the hydraulic cylinder 32 in the three point hitch connection of tractor 19, such that the forks 13 can be moved or tilted from a position as shown in FIG. 9, tilting downwardly, to a position such as shown in FIG. 3 wherein the forks 13 are tilting upwardly. This tilt control is easily accomplished by the above referred to valve control adjacent to the tractor operator.

Additionally, there are sometimes situations wherein a slightly higher lift is needed and wherein it is not imperative that the forks 13 are initially parallel with the ground. Such a circumstance is depicted in FIG. 7 wherein it is desired to move a feed bunk at a time when the feed lot is very muddy. In such circumstances, the tractor would sink deeply into the ground and there would be an insufficient amount of lift available if the hookup was as shown in FIG. 2. In such an instance, the post member 16 can be removed from the end of tube 14 as shown in FIGS. 1–3 and the frame 11 and forks 13 turned over so as to insert the post member 16 within the opposite end of the sleeve 14. Otherwise the FIG. 6 hookup is identical to that shown in FIG. 2, with the pin 17 in place and the hydraulic cylinder 32 pivotally connected to the plate 28 and to the top point 33 of the three point hitch 21. This allows an additional lift of approximately the distance between the pins 27 of the laterally extending frame 11 and the level of the longitudinally extending forks 13. The conventional hookup bar 23 may also be used instead of the tilt control cylinder 32 as shown in the FIG. 6 connection, by merely pulling the post member 16 from the sleeve 14 and turning it 180 degrees such that the clevis-like structure 29 faces forwardly instead of the plate 28.

It can therefore be seen from the above description that the present invention is an extremely versatile device which is adapted to nearly any agricultural transporting situation. Additionally, even large haystacks may be moved from place to place by modifying the structure shown in FIGS. 1–7 and 9 by adding additional forks 13 as shown in FIG. 8.

Obviously many other modifications and variations of the present invention are possible in light of the above teachings. It is therefore to be understood that, within the scope of the appended claims, the invention may be practiced otherwise than as specifically described.

We claim:

1. An item transporting device, adapted to be connected to a tractor three point hitch of the type having two parallel draft arms with rearwardly extending ends and a fixed pivotal point above and between the draft arms, comprising:

a laterally extending frame;

at least one longitudinally extending fork lift member attached to said frame and extending rearwardly therefrom;

first means for pivotally connecting the frame to the rearwardly extending ends of the draft arms;

a connection member pivotally connected at one end thereof to the fixed pivotal point of the three point hitch; and second means connected to said frame, above said first means, for pivotally connecting the other end of said connection member to said frame, said second means comprising:

a sleeve connected to said frame;

a post member slidably received in one end of said sleeve;

means for releasably fixing the position of said post member with respect to said sleeve; and an apertured forwardly extending plate affixed to one end of said post member pivotally connected to said connection member.

2. The device as defined in claim 1 wherein a clevis extends on the opposite side of the post member; and said post member has means thereon for selectively allowing 180° repositioning of said post member with respect to said sleeve.

3. The device as defined in claim 1 including means for permitting the post member to be received in the other end of the sleeve.

4. The device as defined in claim 1 wherein said first means is vertically spaced from said fork lift member.

5. The device as defined in claim 1 wherein said connection member comprises a hydraulic cylinder.

* * * * *